United States Patent [19]

Grinin et al.

[11] 4,270,037

[45] May 26, 1981

[54] ARC WELDING MACHINE USING NON-CONSUMABLE ELECTRODE

[76] Inventors: Vladimir V. Grinin, ulitsa Raitsentr, 43, kv. 34, Krasnogorsk Moskovskoi oblasti; Mikhail M. Shtrikman, ulitsa Molodezhnaya, 4, kv. 186, Moscow, both of U.S.S.R.

[21] Appl. No.: 92,687

[22] Filed: Nov. 9, 1979

[51] Int. Cl.[3] .................................. B23K 9/12

[52] U.S. Cl. .................................. 219/125.12; 219/75; 219/124.02; 219/124.1; 219/124.33

[58] Field of Search .................. 219/75, 124.02, 124.1, 219/124.33, 125.12

[56] References Cited

U.S. PATENT DOCUMENTS

| | | | |
|---|---|---|---|
| 3,989,921 | 11/1976 | Ohi et al. | 219/125.12 |
| 4,136,273 | 1/1979 | Eujita et al. | 219/75 |

*Primary Examiner*—C. C. Shaw

*Attorney, Agent, or Firm*—Haseltine and Lake

[57] ABSTRACT

An arc welding machine using non-consumable electrode comprises a welding head the body of which accommodates two non-consumable electrodes arranged at an angle to a passage formed therein and intended for a filler wire to extend therethrough. The welding head is operably connected with a mechanism enabling its vertical movement, and with an electrode oscillating mechanism, the former and the latter being electrically connected to an arc length stabilizer and arc length control device, which, in turn, are connected with a sensor means for sensing angular position of the non-consumable electrodes. Electrically connected to the non-consumable electrodes is a mechanism intended for reversing longitudinal motion of the welding head.

1 Claim, 6 Drawing Figures

ARC WELDING MACHINE USING NON-CONSUMABLE ELECTRODE

The present invention relates to automatic gas-shielded arc welding, and more particularly, to an arc welding machine using non-consumable electrode.

This invention is readily adapted to application in multi-pass welding of thick-wall joints with the preparation of narrow weld grooves, primarily of small length.

Wide industrial application of welding constructions with high-loaded elements manufactured from high-strength steels and titanium alloys calls for automatic welding operation required to assure stable quality of multi-layer weld in butt joints of large thickness. Automatic welding is badly needed for making butt joints with short-length weld seams. The overheating of the short-length butt-type joint, due to take place in the process of welding, will result in the softening of a substantial area immediately adjacent to the weld, as well as in the impairment of strength characteristics of the weld joint. One of the possible and most promising ways to ensure stable quality of multi-layer weld over a short-length joint is to bring down the weld heat input by an appropriate distribution of heat energy between the welding metal and the added or filler metal.

DESCRIPTION OF THE PRIOR ART

U.S.S.R. Inventor's Certificate No. 531,685 describes an arc welding machine using non-consumable electrode, which comprises a welding head, the body of which accommodates a non-consumable electrode allowed to move along its axis and to rotate thereabout so as to ensure controlled distribution of the arc heat between the welding edges and the filler wire. This welding machine also incorporates a welding head longitudinal travel mechanism and a welding head vertical travel mechanism, rigidly connected with each other. The welding head vertical travel mechanism is geared to the welding head. There are also provided a non-consumable electrode oscillating mechanism rigidly connected with the body of the welding head and geared to the non-consumable electrode, a device for controlling the arc length at the welding edge, electrically connected with the electrode oscillating mechanism. In the welding machine under review, the non-consumable electrode is rigidly connected with a guiding nozzle through which the filler wire is passed so as to be fed to the arc at an angle of less than 90 deg. to the weld surface.

Because of this, the welding head is enabled to travel in one direction only, which is disadvantageous in that the welding process is discontinued as the weld head returns to its original position after performing welding of each successive layer of the weld, thereby materially lowering welding efficiency.

Moreover, the beginning and the end of welding of each layer should be carried out with due regard to the weld metal shrinkage allowance, which at times may amount to 30 percent of the weld length, thus bringing down welding productivity and increasing consumption of materials.

SUMMARY OF THE INVENTION

It is therefore the primary object of the invention to provide such an arc welding machine using non-consumable electrode that will make it possible to enhance efficiency of the welding process.

Another object of the invention is to improve quality of the weld joint.

These and other objects of the invention are attained in an arc welding machine using non-consumable electrode, comprising a welding head, the body of which accommodates a non-consumable electrode allowed to move along its axis and to rotate thereabout so as to ensure controlled distribution of the arc heat between welding edges and a filler wire, a welding head longitudinal travel mechanism and, rigidly connected therewith, a welding head vertical travel mechanism geared to the welding head, an electrode oscillating mechanism rigidly connected with the body of the welding head and geared to the non-consumable electrode, a device for controlling the length of the arc at the welding edge, electrically connected to the electrode oscillating mechanism, according to the invention, the welding head additionally comprises another non-consumable electrode mounted in its body so as to be able to move along its axis and rotate thereabout, with the filler wire extending through a passage formed in the body of the welding head along its axis in the interspace between the non-consumable electrodes arranged at an angle to the passage so as to provide for a reguisite spacing between the tips of the electrodes and the filler metal, sufficient to enable simultaneous melting of the filler wire and the weld, effected by means of each non-consumable electrode, the welding machine also incorporating an arc length stabilizer electrically connected to the welding head vertical travel mechanism, and a welding head motion reversing mechanism through which each of the non-consumable electrodes is electrically connected to the arc length control device and to the arc length stabilizer, and a sensor means intended for sensing angular position of the non-consumable electrodes and ensuring alternate operation of the arc length control device at the welding edge and of the arc length stabilizer over the weld axis by changing, respectively, the angle of deflection of the non-consumable electrodes and the distance between the tips thereof and the surface of the weld, the electrode oscillating mechanism being geared to the additional non-consumable electrode.

With the present invention it becomes possible to perform good quality production of a weld during both forward and backward directions of welding, which creates necessary conditions for continuous filling of the entire cross section of the weld and obviates the need for the weld metal shrinkage allowance, thus enhancing efficiency of the welding process.

Furthermore, the present invention makes it possible to reduce power requirements due to both the programmed redistribution of power across the electrodes and more effective use of the arc heat.

In addition, the alteration in the direction of welding of each layer of the weld relative to the preceding layer thereof improves conditions for solidification of the weld metal and assures lower degree of deformation, thus improving quality of the weld joint.

BRIEF DESCRIPTION OF THE ACCOMPANYING DRAWINGS

The invention will be now described, by way of example only, with reference to the accompanying drawings, wherein.

DETAILED DESCRIPTION OF THE PREFERRED EMBODIMENT

Figure 1:
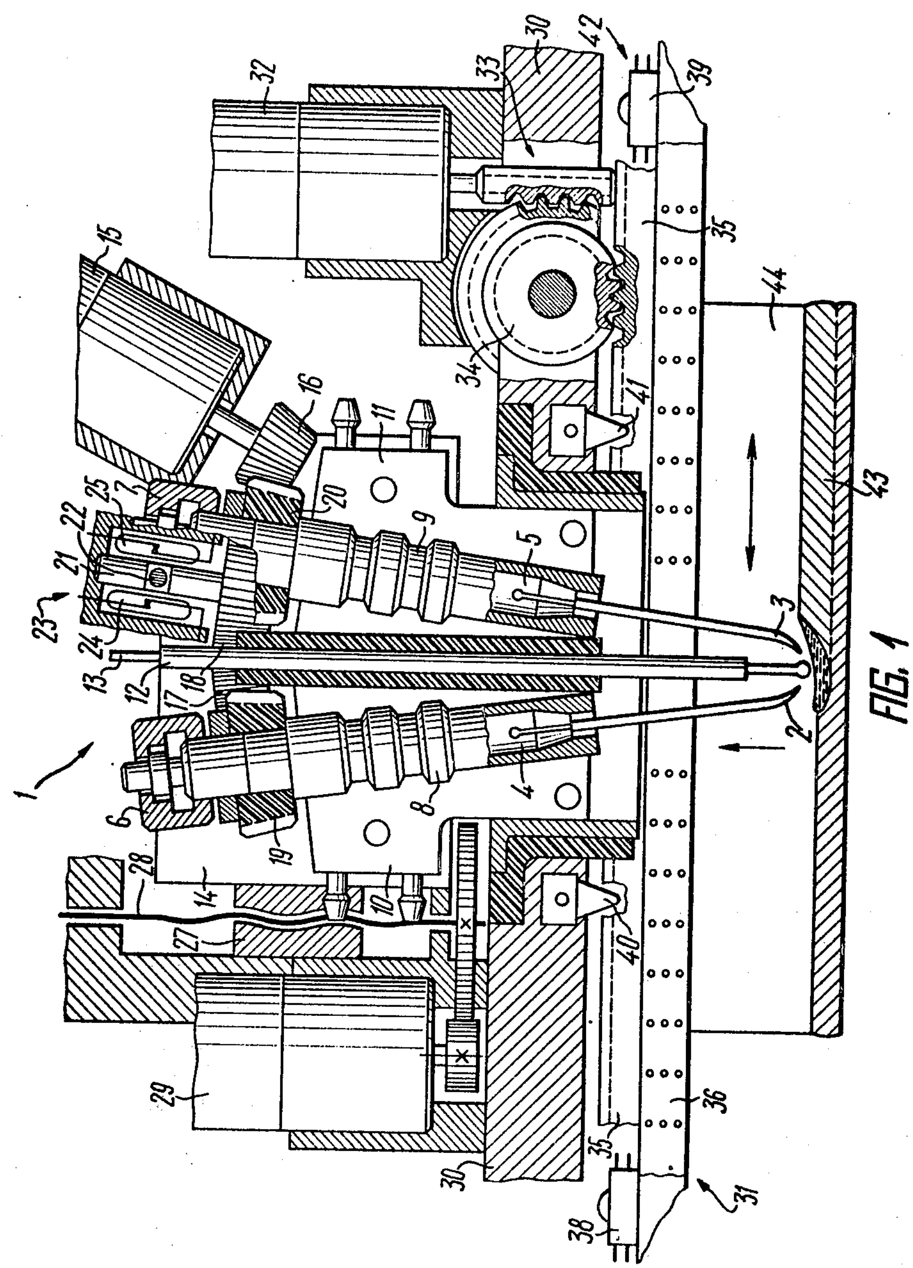
FIG. 1 is a longitudinal sectional view of an arc welding machine using non-consumable electrode, according to the invention.

Let us now consider, by way of example, an arc welding machine using non-consumable electrode, which machine is employed in the operation of mounting a load-bearing frame, being part of a high-strength stainless steel construction, for welding girder tee joints.

The illustrated embodiment of the invention (FIG. 1) comprises a welding head 1 which is provided with non-consumable electrodes 2 and 3 having bent-away tips and fixed respectively by means of split sockets 4, 5 and union nuts 6, 7 in contact nozzles 8 and 9. The nozzles 8 and 9 are respectively articulated in water-cooled insulating bushings 10 and 11 and arranged at an angle to a passage 12 through which extends a filler wire 13. The bushings 10 and 11 are rigidly fixed on a body 14 of the welding head 1.

The welding machine also incorporates an electrode oscillating mechanism 15 rigidly fixed on the body 14 of the welding head 1. The mechanism 15 is geared to the non-consumable electrodes 2 and 3 through its drive gear 16, intermediate gears 17 and 18, and driven gears 19 and 20, which are fixed on those ends of the contact nozzles 8 and 9 which are remote from the passage 12.

Secured on the intermediate gear 18 and arranged in coaxial alignment therewith is a rod 21 which mounts a permanent magnet 22 of a device 23 for sensing angular position of non-consumable electrodes, which device is fixedly attached to the body 14 of the welding head 1. The sensor 23 also comprises magneto-controlled contacts 24, 25 and 26 (FIG. 2), which are mounted in coaxial alignment with the rods 21 (FIGS. 1, 2) at a distance sufficient to ensure their operability on interaction with the permanent magnet 22. Operably connected with the body 14 of the welding head 1 through a nut 27 and a screw 28 is a mechanism 29 for vertical movement of the welding head 1. The mechanism 29 is secured on a movable platform 30 geared to a stationary platform 31. Also mounted on the platform 30 and rigidly fixed thereon is a mechanism 32 (FIG. 1) intended to enable longitudinal movement of the welding head 1, which mechanism is geared through a worm pair 33 and a pinion 34 to a rack 35 secured on the platform 31. Fixed on the platform 31 are gas cover-plates 36 and 37 (FIG. 2) and switches 38 and 39 (FIG. 1), which interact with respective press rods 40 and 41 adjustably mounted on the platform 30. The switches 38, 39 and the rods 40, 41 are incorporated in a mechanism 42 intended for reversing longitudinal motion of the welding head 1.

Figure 2:
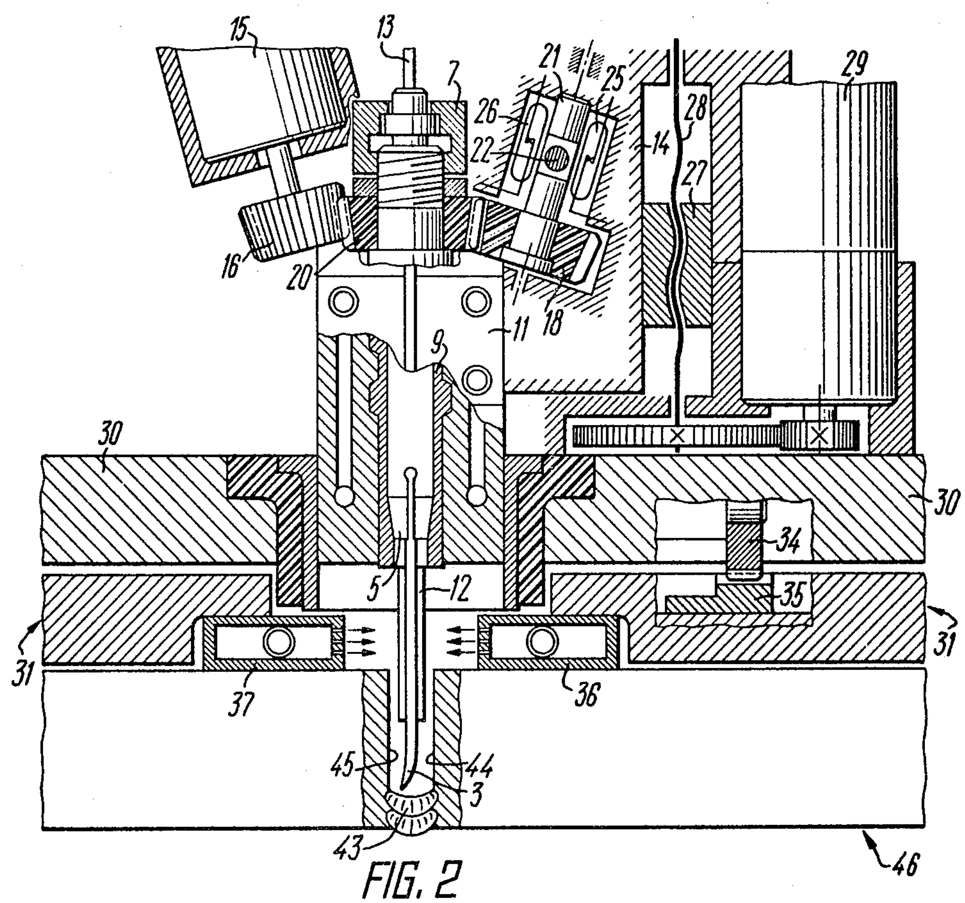
FIG. 2 is cross-sectional view of an arc welding machine using non-consumable electrode, according to the invention.

The welding machine is fixed so as to be in axial-parallel arrangement, with a weld 43 (FIGS. 1, 2) in a manner to permit the electrodes 2, 3 and the filler wire 13 to be located between welding edges 44 and 45 (FIG. 2) of a workpiece 46 (FIGS. 1, 2).

To enable automatic short-arc welding performance, the welding machine of the invention is provided with a device 47 for controlling the length of the arc at the welding edge, and an arc length stabilizer 48. The control device 47 comprises a comparator 49 having connected thereto two switches 50 and 51. The arc stabilizer 48 comprises a comparator 52 with a switch 53 being connected thereto. Connected to the switches 50 and 51 is the electrode oscillating mechanism 15 (FIG. 3) which is geared to the non-consumable electrodes 2, 3 and to the welding head 1. Connected to the switch 53 is an electric actuator 54 of the welding head vertical travel mechanism 29. The mechanism 29 also comprises two switches 55, 56 which are geared to the welding head 1.

The magneto-controlled contacts 24, 25, 26 are electrically connected to the respective switches 50, 51, 53. The magnet 22 is operably connected with the welding head travel mechanism 32. Connected with the mechanism 32 is the welding head motion reverse mechanism 42 which comprises a control circuit 57 having connected thereto the switches 38 and 39 operably connected with the welding head 1.

Connected to the control circuit 57 is make-and-break switch 58 which is connected through welding arcs 59, 60 with the electrodes 2 and 3, as well as with the comparator 49 and comparator 52.

Figure 4:
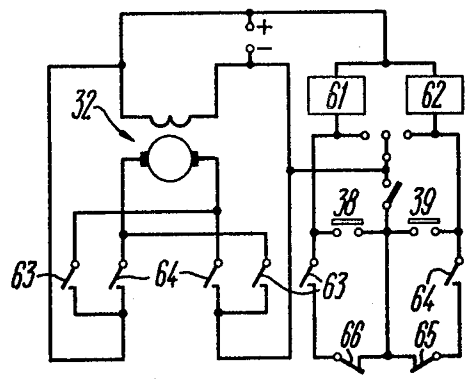
FIG. 4 is a circuit diagram of a mechanism for reversing longitudinal motion of a welding head, according to the invention.

The control circuit 57 comprises two relays 61, 62 (FIG. 4) which are electrically connected to the respective switches 38 and 39. Normally open contacts 63, 64 and normally closed contacts 65, 66 are electrically connected to the electric actuator 32 and to the switches 38, 39.

Figure 3:
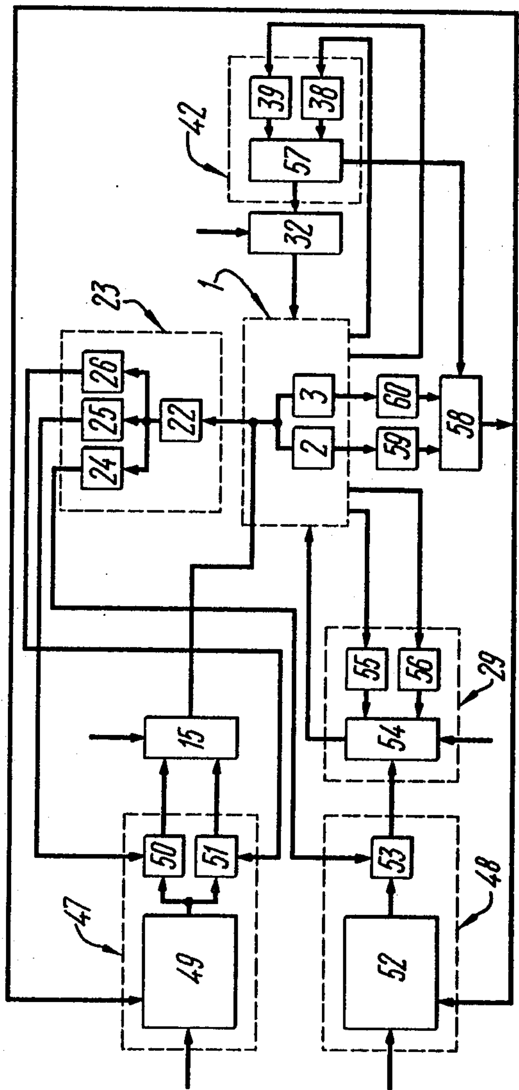
FIG. 3 is a block diagram of an arc welding machine using non-consumable electrode, according to the invention.
Figure 5:
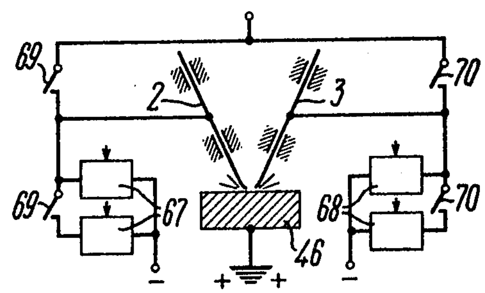
FIG. 5 is a circuit diagram of a welding power supply circuit according to the invention.

The arc welding machine of the invention also comprises devices 67 and 68 (FIG. 5) for controlling the welding current in the circuit of the electrodes 2 and 3, respectively. Normally open contacts 69 and 70 of the respective relays 61 and 62 are part of the control circuit 57 (FIG. 3) and are electrically connected to the respective control devices 67 and 68 (FIG. 5), electrodes 2 and 3, and to the comparators 49 and 52 (FIG. 3).

Figure 6:
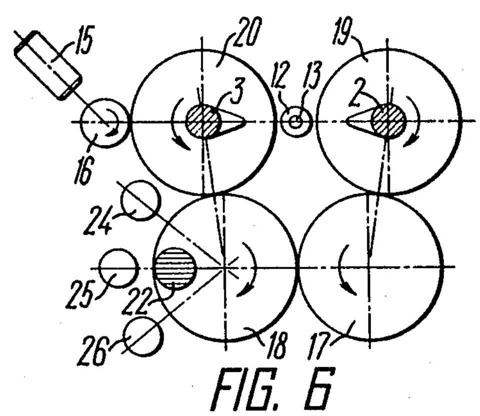
FIG. 6 is a functional diagram of an electrode oscillating mechanism, according to the invention.

Shown in FIG. 6 is a functional diagram representing the extent of deflection of the non-consumable electrodes 2 and 3.

The arc welding machine of the invention operates in the following manner.

The electrodes 2 and 3 (FIG. 1) are set to gage in accordance with a predetermined extension length thereof. The electrodes in question are adjusted in their respective sockets 4 and 5, and are fixed therein by means of the screw-nuts 6 and 7 so that the bent-away tips of the electrodes face the filler wire 13 (FIGS. 1, 6) and lie therewith in the same plane. The spacing between the electrodes 2, 3 and the filler wire 13 is taken to be within the range of 5 to 7 mm. Before the electrodes 2 and 3 are adjusted and fixed in position, the axis of the permanent magnet 22 is aligned with the axis of the magneto-controlled contact 25 of the sensor 23, which corresponds to the alignment of the bent-away tips of the electrodes 2 and 3 with the axis of the weld 43 (FIGS. 1, 2). Thereafter, the welding machine is fixedly mounted on the work-piece 46 so as to bring the plane, in which lie the electrodes 2, 3 and the filler wire 13, in coincidence with the axis of the welding joint.

After the welding machine has been fixed on the workpiece 46, the mechanism 42 intended for reversing longitudinal motion of the welding head 1 is set for operation. The press rods 40 and 41 are positioned in accordance with the length of the weld 43 at a distance of 7 to 10 mm from the butt ends of the weld joint. The welding head 1 is brought together with the movable platform 30 in one of the extreme positions lengthwise of the weld 43, at which the switch 38 is actuated. Next, a shielding gas and cooling water are fed, and an oscillator (not shown) is actuated to start the welding arcs 59, 60 (FIG. 3) between the electrodes 2 and 3 (FIGS. 1, 5) and the workpiece 46, the current of the arcs 59 and 60 being I=10 to 20 A. After the arc discharge has been stabilized across the electrodes 2 and 3, the current I of the arcs 59 and 60 is increased to an operating value. Afterwards, the electrode oscillating mechanism 15, the arc length control device 47 and the arc length stabilizer 48, a mechanism (not shown) for feeding the filler wire 13 (FIGS. 1, 2) and the welding head travel mechanism 32 are brought into use in sequential order. With the welding head 1 being in one of the extreme positions, the switch 38 (FIGS. 1, 4) closed, the supply circuit of the relay 61 is made, and the supply circuit of the relay 62 is broken by means of the contact 65. The relay 61 operates to actuate the mechanism 32 through its contacts 63, and throught the normally open contact 69, the relay 61 actuates the control device 47 (FIG. 3) and stabilizer 48, thereby permitting current to pass thereto from the arc 59 of the electrode 2 positioned after the filler wire 13 (FIGS. 1 and 2). The welding head 1 starts moving in the direction away from the switch 38 toward the switch 39, thereby initiating welding of the first layer of the weld 43. In the process of welding, the voltage across the welding arc 59 (FIG. 3) of the electrode 2 is applied to the comparator 49 (FIG. 3) and comparator 52, which are actuated alternately by the switches 50, 51 and 53 when brought into action on command from the sensor 23. At this time the tips of the electrodes 2 and 3 (FIG. 1) are respectively positioned near the edge 44 (FIG. 2), on the axis of the weld 43 and at edge 45. The stabilizer 48 operates intermittently, depending on the operation of the magneto-controlled contact 25 (FIGS. 1, 2, 3), interacting with the permanent magnet 22. This being the case, the requisite spacing between the tip of the electrode 2 and the surface of the weld 43 is maintained automatically by means of the comparator 52, the actuator 54 of the mechanism 29 operating intermittently. The comparator 59 is used to meter the voltage across the arc 59 in proximity to the edges 44 and 45, the contact 24 or 26 being made. Next, a signal is fed to reverse the rotation of the electrodes 2 and 3, which is to take place when the value of the arc voltage will be lower than that on the axis of the weld 43, and then will go down to a preset value, as the electrode 2 is alternately brought together with the edges 44 and 45. Thus, the first layer is welded and the length of the arcs 59 and 60 is stabilized at each welding edge 44, 45, by changing the angle of deflection of the electrodes 2 and 3, as well as over the axis of the weld 43, the stabilizer 48 operating intermittently. As the welding head 1 approaches the end of the butt joint of the workpiece 46 i.e. when the axis of the filler wire 13 is within a distance of 7 to 10 mm, the press rod 41 is operated to actuate the switch 39. As this happens, the relays 61 and 62 are switched over (the relay 62 is switched on and the relay 61 is switched off), and the reversing mechanism 32 (FIG. 4) is actuated to move the welding head 1 in the opposite direction from the switch 39 to the switch 38. Thus, the second layer of the weld 43 undergoes welding. After the mechanism 32 has been actuated to reverse the travelling direction of the welding head 1, the contacts 70 (FIG. 5) of the relay 62 (FIG. 4) are made to actuate the stabilizer 48 (FIG. 3) and control device 47, drawing current from the arc 60 of the electrode 3, which, longitudinal motion reversed, begins to travel in the wake of the filler wire 13 (FIG. 1). As the welding head 1 approaches the butt joint of the workpieces 46, the press rod 40 operates to actuate the switch 38. Here the travelling direction of the welding head 1 is reversed once again to start welding of the next layer of the weld 43. Thus, the shuttle movement of the welding head 1 and gradual filling of the weld 43 continues until the latter is filled up, whereafter the welding process is discontinued. As the weld 43 is filled, the welding head 1 continues its vertical movement, which is effected automatically by means of the comparator 52 (FIG. 3) through stabilization of the lengths of the arcs 59 and 60 over the axis of the weld 43 (FIG. 1).

By altering parameters of the welding current in the arcs 59 and 60 (FIGS. 3 and 5) by means of the control devices 67 and 68, and in the welding circuit of each electrode 2 and 3, it becomes possible to effect automatic changes in the welding current 1 thereacross, to control over wide limits the amount of heat put into the workpiece 46 (FIG. 1), to enhance the penetration capability and to thereby materially reduce energy requirements of the welding process and overheating of the short-length joint.

If, for example, the arc 59 or 60 of the electrode preceding the filler wire 13 (FIG. 3) acts on the surface of the preceding layer of the weld 43, practically uncovered with liquid filler metal, the welding current value across this electrode (FIG. 2) may be lowered.

In welding 40 mm thick butt joint from high-strength stainless steel, good results have been obtained with current ratio being 1:2 (the current of the preceding electrode being $I_1$=100 A, the current of the succeeding electrode being $I_2$=200 A at V=7 to 10 m/h).

What is claimed is:

1. An arc welding machine using non-consumable electrode, comprising:

a welding head;

a body of said welding head, having an interior surface;

a passage formed in said interior surface, with a filler wire extending therethrough;

two current nozzles of said welding head, each being articulated within said body and arranged at an angle to said passage so as to be able to rotate about its axis:

two non-consumable electrodes of said welding head, each having a bent-away tip and being fixed in one of said nozzles so as to be able to move along its axis, thereby ensuring a requisite spacing between the said bent-away tips;

a welding head vertical travel mechanism geared to said welding head;

a screw pair of said welding head vertical travel mechanism, having a nut and a screw and being fixed in position by said nut on the body of said welding head;

an actuator of said welding head vertical travel mechanism, operably connected with the screw of said screw pair;

a movable platform mounting said actuator of said welding head vertical travel mechanism;

a welding head longitudinal travel mechanism geared to the welding head;

an actuator of said welding head longitudinal travel mechanism, said actuator being operably connected with said movable platform;

an electrode oscillating mechanism geared to said welding head;

an actuator of said electrode oscillating mechanism, said actuator being rigidly connected with the body of said welding head;

a gear drive of said electrode oscillating mechanism, said oscillating actuator being geared to said actuator and to said non-consumable electrodes of the welding head;

a sensor means for sensing angular position of the non-consumable electrodes, said sensor means having an input, a first output, a second output and a third output, and being operably connected through said input thereof with said nonconsumable electrodes;

a make-and-break switch having a first input, a second input, a third input and an output, and having its first and second inputs connected with said non-consumable electrodes at the moment when the welding process is started;

a device for controlling the arc length at a welding edge, said device having a first input, a second input, a third input, a first output and a second output, and being connected through its first input with said output of said make-and-break switch, through its second and third inputs respectively with said first and second outputs of said electrode position sensor means, and through its first and second outputs with the actuator of said electrode oscillating mechanism;

an arc length stabilizer having a first input, a second input and an output, said stabilizer being connected through its first input with the output of said make-and-break switch, through its second output with the third output of said electrode position sensor means, and through its output with the actuator of said welding head vertical travel mechanism;

a mechanism for reversing longitudinal motion of said welding head, said mechanism having a first input, a second input, a first output and a second output, and being operably connected through its first and second inputs with said welding head, through its first output with the third input of said make-and-break switch, and through its second output with the actuator of said welding head longitudinal travel mechanism.

* * * * *